(12) United States Patent
Jesse

(10) Patent No.: US 6,689,240 B2
(45) Date of Patent: Feb. 10, 2004

(54) WINDOW FRAME ASSEMBLY FOR USE IN AN AIRCRAFT AND ASSOCIATED METHOD OF MANUFACTURE

(75) Inventor: David W. Jesse, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 143 days.

(21) Appl. No.: 09/732,764

(22) Filed: Dec. 11, 2000

(65) Prior Publication Data

US 2003/0034114 A1 Feb. 20, 2003

Related U.S. Application Data

(62) Division of application No. 09/323,157, filed on Jun. 1, 1999, now Pat. No. 6,318,035.

(51) Int. Cl.$^7$ ................................................. C03C 27/04
(52) U.S. Cl. ..................... 156/108; 156/275.7; 156/293
(58) Field of Search ......................... 156/108, 99, 107, 156/273.3, 275.5, 275.7, 293; 244/129.3; 359/350; 52/171.1, 208, 204.5

(56) References Cited

U.S. PATENT DOCUMENTS

| | | | |
|---|---|---|---|
| 3,919,022 A | * 11/1975 | Stefanik | 156/108 |
| 4,027,160 A | 5/1977 | Driffield et al. | |
| 4,046,933 A | * 9/1977 | Stefanik | 156/107 |
| 4,090,773 A | 5/1978 | Bauer et al. | |
| 4,277,294 A | * 7/1981 | Orcutt | 156/99 |
| 4,450,661 A | * 5/1984 | Whitener | 52/208 |
| 4,699,335 A | * 10/1987 | DeOms et al. | 244/129.3 |
| 4,937,450 A | 6/1990 | Wakabayashi et al. | |
| 4,963,206 A | 10/1990 | Shacklette et al. | |
| 4,990,782 A | 2/1991 | Wellman et al. | |
| 5,065,842 A | 11/1991 | Nahar | |
| 5,277,384 A | 1/1994 | Webb | |
| 5,443,912 A | * 8/1995 | Olson | 156/108 |
| 5,592,060 A | 1/1997 | Racine et al. | |
| 5,818,631 A | 10/1998 | Askinazi et al. | |
| 6,038,065 A | 3/2000 | Borden | |

OTHER PUBLICATIONS

U.S. application Ser. No. 09/323,157 filed Jun. 1, 1999.

* cited by examiner

*Primary Examiner*—Geoffrey L. Knable
(74) *Attorney, Agent, or Firm*—Burns, Doane, Swecker & Mathis, LLP

(57) ABSTRACT

An IR window frame assembly for use within an aircraft is manufactured at a high temperature with both the window pane and the window frame of the window frame assembly having beveled surfaces. These beveled surfaces are placed in direct contact during manufacture. As a result, the window frame assembly maintains a low radar cross section (RCS) while allowing the window assembly to be small enough to conform with aerodynamic tolerances required in an aircraft.

7 Claims, 6 Drawing Sheets

WINDOW FRAME ASSEMBLY FOR USE IN AN AIRCRAFT AND ASSOCIATED METHOD OF MANUFACTURE

This application is a divisional of Application No. 09/323,157, filed Jun. 1, 1999, now U.S. Pat. No. 6,318,035.

BACKGROUND OF THE INVENTION

1. Field of the Invention

The present invention generally relates to a window frame assembly for use in high speed aircraft and a method for installation of a window pane into a window frame when making the window frame assembly. More specifically, the present invention relates to the formation of a window assembly for a high speed aircraft to ensure that a low radar cross section (RCS) is maintained during the various conditions encountered by the aircraft.

2. Background Information

Sensors used in high speed aircraft, in order to properly function, need to be protected from the environment (e.g., wind and rain). This is normally achieved through the placement of an infrared (IR) window on the outer skin of aircraft to protect the sensors and allow them to function properly. An IR window allows radiation to pass through the window and be detected by sensors located behind the window. For high speed aircraft that require a low RCS, IR windows can present a problem. Aircraft require a low RCS to appear as a small object or not appear at all, to a radar detection system. The RCS of an aircraft is a measure of how well the aircraft absorbs radar energy or reflects radar energy in a direction away from the source of the radar energy.

Conventional IR windows placed onto aircraft for protection of sensors include an interface (or ridge) between the window and the window frame that would reflect radar energy directed at the aircraft. As a result, the aircraft's RCS would increase, thereby increasing the chances that a radar system would detect the aircraft. Early design specifications therefore used a 6" by 6" diamond shaped window to allow for proper dissipation and reflection of received radar energy due to the joint between the window pane and window frame on an aircraft. However, from a practicality standpoint, a window having such dimensions is too large to place in the surface of an aircraft because of aerodynamic and structural requirements. Minimum bend radius requirements resulted in a need to drastically alter the shape of an aircraft to account for such windows. Smaller windows could have theoretically been used, but would increase the RCS, thereby making the aircraft easily detectable by radar.

Subsequently, efforts turned to removing any interface (or ridge) between the window and the frame. For example, a smaller window was constructed and an electrically conductive epoxy was placed between the window pane and the window frame to make the window flush with the frame. FIG. 1 shows a partial view of a conventional window frame assembly 100. The frame assembly includes a window pane 110 and a window frame 130. A conductive epoxy 120 is placed along the entire radius of the window pane 110 and the window frame 130 to hold the window pane 110 to the window frame 120. Such a system has drawbacks. When an aircraft is traveling at a great rate of speed and encounters heavy rain (for example, raindrops having a diameter of approximately 2 mm with a rainfall rate of approximately 2 inches per hour), the rain erodes the conductive epoxy located between the window pane and the window frame. After approximately 10 minutes the epoxy will have been entirely eroded, and the epoxy and/or window pane will fall out of the frame thereby increasing the RCS of the airplane as well as possibly damaging sensors behind the window pane.

To account for the effect of heavy rain on the conductive epoxy, soldering of the window into the frame has been attempted. While rain encountered during flight will not erode solder, the large temperature variation that an aircraft will typically encounter (e.g., −65° F. to +250° F.) can cause the window pane to shatter due to the stress induced by the solder on the sides of the window pane. While soft solders have been considered, they are not a practiced solution because of their susceptibility to rain erosion.

U.S. Pat. No. 5,818,631 and U.S. Pat. No. 4,090,773 each describe the application of a protective layer material onto an IR window. However, neither of these patents address the issue of reducing the RCS of the window. Therefore, there is a need for an aircraft window frame assembly having small window panes which can provide a low RCS.

SUMMARY OF THE INVENTION

The present invention is directed to providing a window frame assembly which reduces an RCS of an aircraft and is small enough to conform with aerodynamic tolerances. In accordance with an exemplary embodiment of the present invention, a method for forming a window frame assembly for use over a predetermined range of temperatures is provided which comprises the steps of: establishing a receiving area for an electrically conductive window; placing said electrically conductive window into the receiving area; applying an adhesive to an area between the receiving area and the electrically conductive window; and raising a temperature of said receiving area and said electrically conductive window to at least an upper limit of said predetermined range to cure the adhesive.

Exemplary embodiments of the present invention include an electrically conductive window frame assembly which comprises: an electrically conductive window pane, having beveled sides; and an electrically conductive window frame, wherein the window frame contains a beveled surface and wherein the beveled surface of the window pane interfaces with the beveled surface of the window frame. In alternate embodiments, an adhesive can be employed to bond the electrically conductive window pane to said electrically conducive window frame and/or retaining clips can be used secure the electrically conductive window pane to the electrically conductive window frame.

BRIEF DESCRIPTION OF THE DRAWINGS

Other objects and advantages of the present invention will become apparent to those skilled in the art from the following detailed description of preferred embodiments, when read in conjunction with the accompanying drawings wherein like elements have been designated with like reference numerals and wherein.

DETAILED DESCRIPTION OF THE INVENTION

Figure 1:
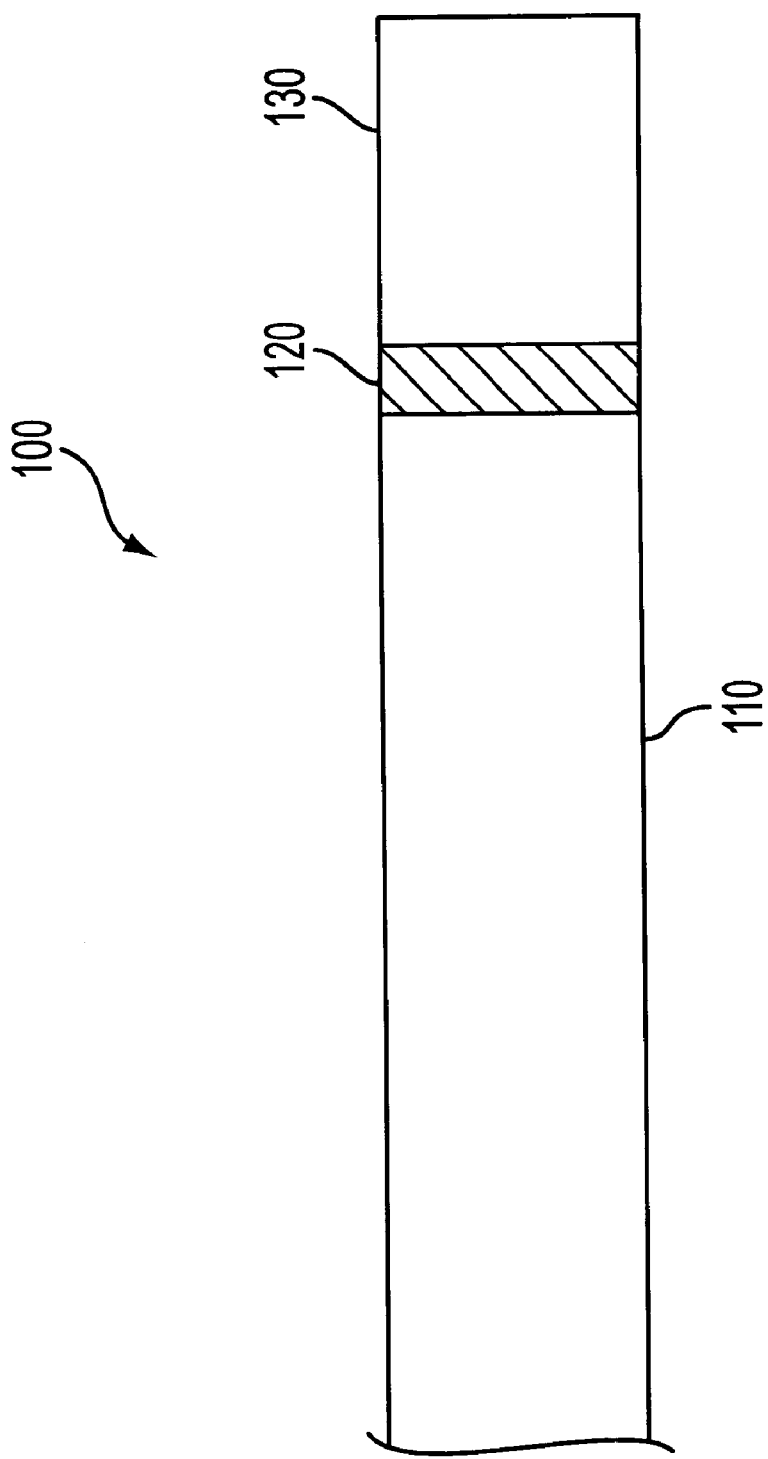
FIG. 1 illustrates a partial side view of a conventional window frame assembly.
Figure 2:
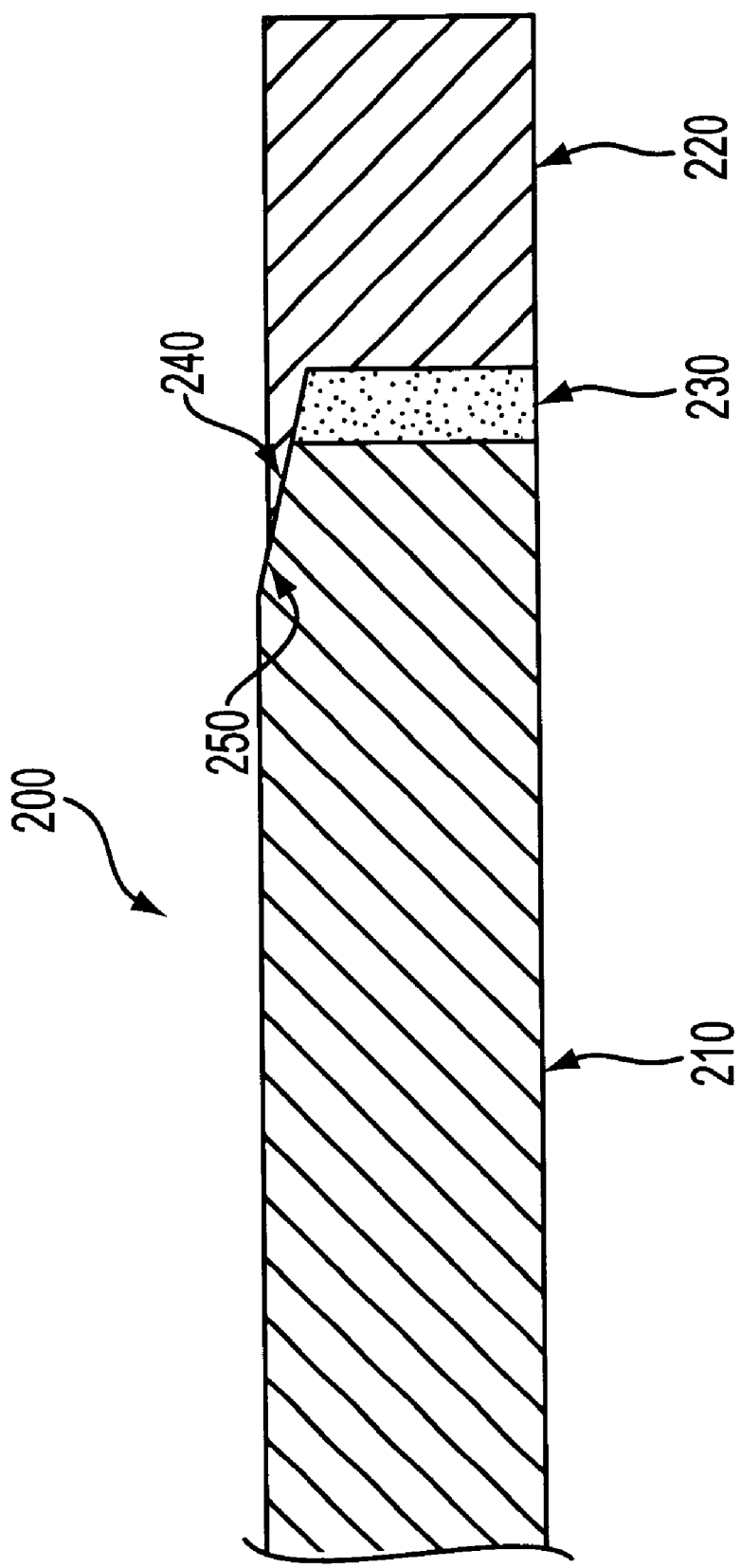
FIG. 2 illustrates a partial side view of a window frame assembly in accordance with an exemplary embodiment of the present invention.

FIG. 2 shows a side view of a window frame assembly 200 which comprises an IR window pane 210, a window frame 220 and adhesive filler 230, in accordance with an exemplary embodiment of the present invention. The window frame 220 includes a beveled area 240 which constitutes a surface that interfaces with the window pane. The window pane 210 contains a beveled area 250 which constitutes a beveled side shaped to interface (e.g., matched to be flush) with the beveled area 240 of the window frame 220. In the embodiment of the invention as illustrated, there is no adhesive filler located where the beveled area of the window pane and the beveled area of the window frame are in contact. Furthermore, the adhesive filler is not exposed to the outside of the aircraft, or environmental conditions (e.g., wind and rain).

The window 220 frame can be any conductive material while the IR window pane 210 can be any conductive material which is transparent to the incident radiation of interest to the sensor beneath the window. In exemplary embodiments, the window can be partially conductive (e.g., conductive an upper 0.001 to 0.030 of an inch, through the formation of a conductive layer). Alternatively, the window pane 210 can be formed entirely of a conductive material. For example, the window panes can be made out of doped germanium or doped silicon or any other conductive material. Plating materials (e.g., nickel or other materials) can be added to the window frame 220 to give it strength. The plating can be applied over a portion of the window frame 220 or the entire frame. Also, plating (e.g., gold or other materials) can be added over the beveled edge or the entire frame to, for example, prevent oxidation. Plating, such as the gold plating, can be used to ensure that the window frame is conductive since gold is superconductive.

The adhesive filler 230 can be of any type, such as ABLEBOND 450 epoxy, as long as it can withstand the temperature ranges encountered by the aircraft. The present invention is not dependant upon the adhesive to be conductive, as are conventional assemblies, although conductive adhesive can be used if desired. In accordance with an exemplary embodiment of the present invention, the adhesive is protected from the elements due to the beveled window frame 220 and beveled window pane 210. Such a configuration reduces expenses due to the reduction in the amount and type of adhesive required.

Figure 3:
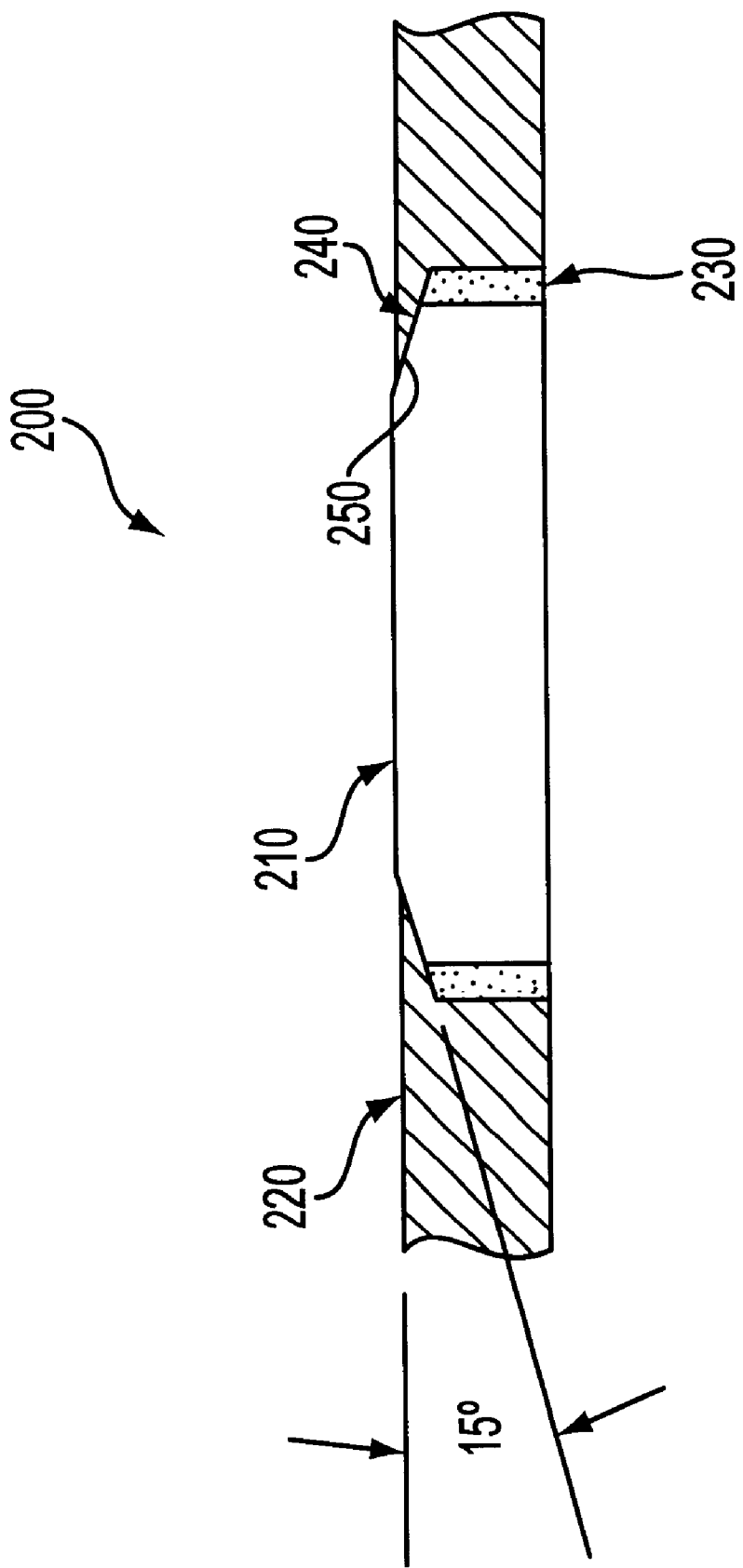
FIG. 3 illustrates a side view of a window frame assembly in accordance with an exemplary embodiment of the present invention.

FIG. 3 shows a side view of an entire window frame assembly 200 in accordance with an exemplary embodiment of the present invention. The beveled areas 250 and 240 of both the window pane 210 and the window frame 220 are flush on all peripheral areas of the window pane 210. As shown in FIG. 3, the beveled angles in accordance with an exemplary embodiment of the present invention can be approximately 15 degrees, or any other desired angle suitable for the materials selected. The angle of the beveled areas ensures that the tip of the window frame lies flush, or substantially flush, against the window pane. The beveling feature also reduces the stress placed onto the window pane due to the absence of adhesive along the entire radius of the window. However, it will be apparent to those skilled in the art that the bevel angle of both the window pane and the window frame can be varied to account for tensile strengths in the material of the window frame. Note in both FIGS. 2 and 3, that adhesive is not required over the entire side (i.e., radius) of the window. However, in an alternate embodiment, adhesive in a portion of the beveled interface can be used if desired, provided the adhesive is adequately shielded from the environment to substantially prevent undesired erosion.

In exemplary embodiments, the window pane 210 can be flush or can protrude slightly from the window frame. Having the window pane 210 protrude from the frame slightly allows for the window and frame to be better braced for rain. In accordance with an exemplary embodiment of the present invention, the protrusion 260 can be approximately 0.005 inch or any other desired protrusion which satisfies specifications of the particular application (e.g., RCS specification). In addition, the window pane 210 can be configured to protrude from the window frame 220, as illustrated in FIG 2. at 260 to allow for efficient reception of radar signals sent from the radar device.

However, those skilled in the art will appreciate that the window pane can also be slightly recessed with respect to the window frame (e.g., up to 0.005 inches or more). When an external current associated with a radar signal of the radar device is induced onto the outer skin of aircraft, it runs along the upper most skin (e.g., the top 0.002 of an inch of an aluminum frame). However, the current runs lower (e.g., approximately 0.01 inches or more or less) into the surface of the window pane and runs across window pane 210. The window pane and window frame can be interfaced such that current runs into the bevel on the other side of the window frame without scattering from the surface of the aircraft, which can cause an increase in the RCS for the aircraft.

Figure 4:
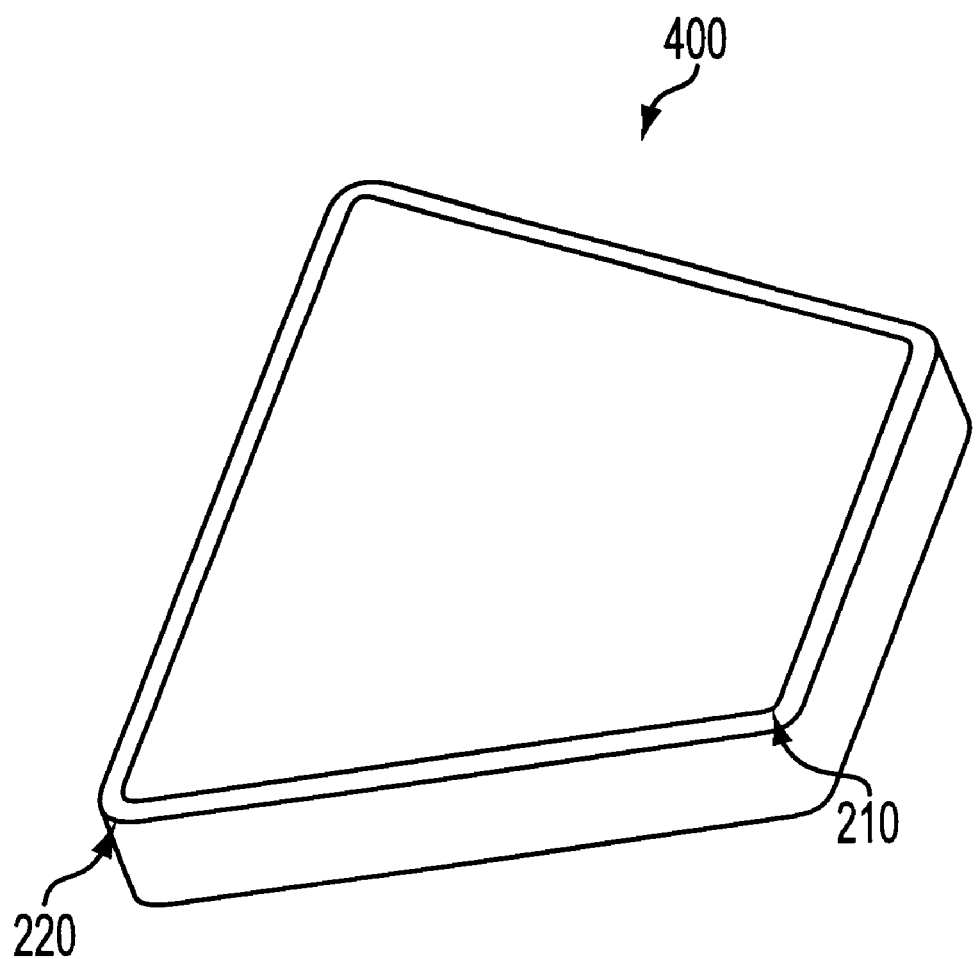
FIG. 4 illustrates a perspective view of a window frame assembly in accordance with an exemplary embodiment of the present invention.

FIG. 4 illustrates a perspective view of an exemplary window frame assembly 400 according to the present invention. Unlike a conventional system wherein the assembly is diamond shaped, the window assembly can take a variety of shapes, such as a circular shaped or the trapezoidal shaped window frame assembly 400, illustrated in FIG. 4.

Figure 5:
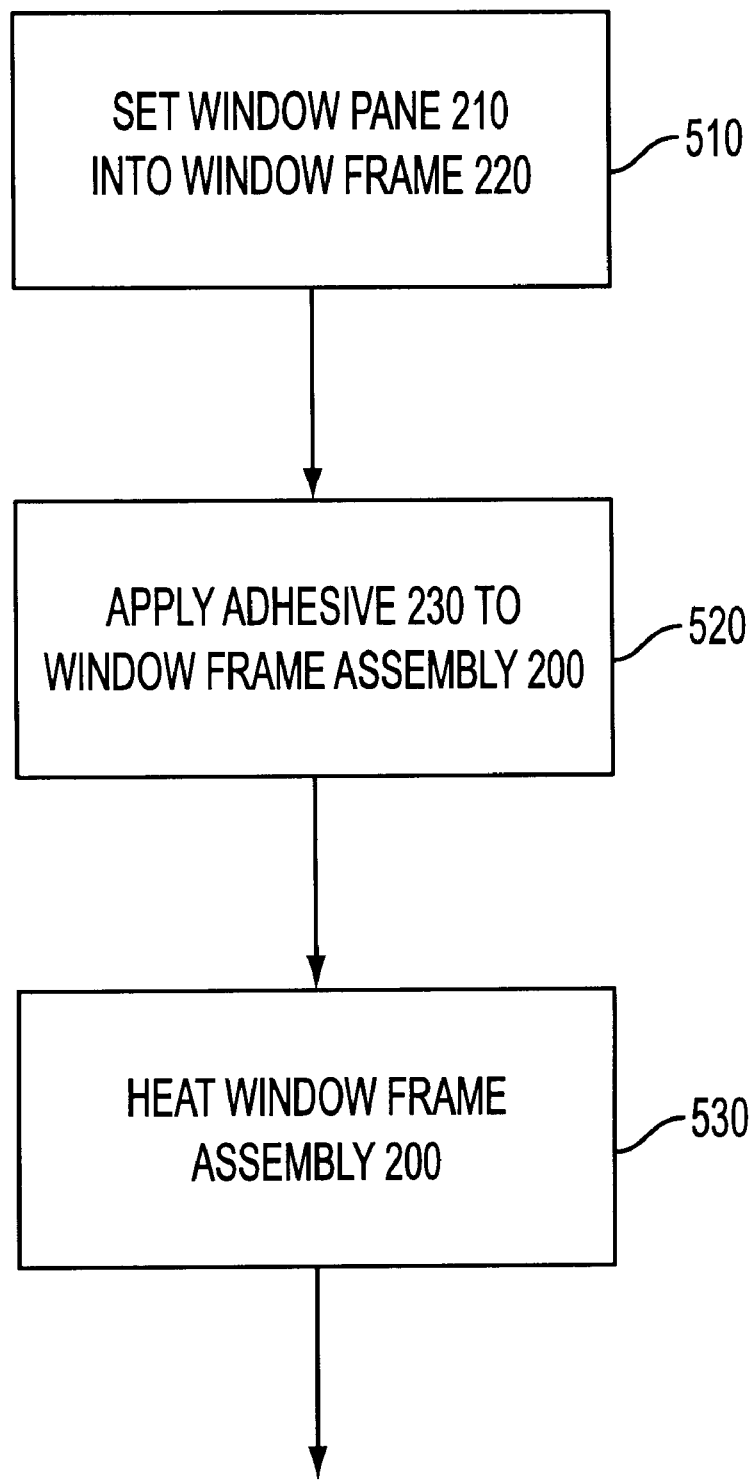
FIG. 5 illustrates a flow diagram describing an exemplary formation of the window frame assembly in accordance with the present invention.

In another embodiment of the present invention, illustrated by the assembly method shown in FIG. 5, the window pane can be installed into the frame in a fashion that ensures that the window will not break or fall out of the aircraft when subjected to drastic changes in environmental conditions. In step 510, the IR window pane 210 is set into the window frame 220. In step 520, adhesive 230 is applied at the area between the window pane 210 and the window frame 220 as shown in FIGS. 2 and 3.

In step 530, the window frame 220, the window pane 210 and the adhesive 230 are heated to an assembly temperature which is at least an upper limit of a predetermined temperature range of interest (e.g., the highest possible temperature that the aircraft is expected to encounter). For example, the upper limit temperature that most military aircraft will encounter falls within a range of between 130 degrees F. to approximately 260 degrees F. However, those skilled in the art will appreciate that the upper temperature specified for a particular aircraft is based upon the characteristics of the aircraft and its expected use.

Heating the window assembly to the assembly temperature with the adhesive in place allows the adhesive to cure to the window pane 210 and window frame 220 at a point in time at which the materials that make up the frame and the pane have expanded due to the high temperature. Normally, the window pane 210, being a non-metal, expands at a slower rate and to a lesser degree than the window frame 220, which is metallic such that a maximum gap between the window frame 220 and the window pane 210 occurs at the highest temperature to which the assembly is subjected.

In accordance with an exemplary embodiment of the present invention, the adhesive is bonded and cured to the frame and window pane at the assembly temperature. Thus, as the window pane 210 and window frame 220 contract, according to their respective thermal expansion characteristics, due to a temperature decrease (i.e., to temperatures below the assembly temperature), the adhesive is subjected to compression forces. Accordingly, the window assembly remains stressed at lower temperatures. When the temperature rises during aircraft use, the stress (which is not enough to cause cracking at normal or low temperatures) is relieved, yet the frame and the window do not lose contact with one another. It will be understood however by those skilled in the art that the temperature at which the window pane and window frame of the assembly are bonded can be varied to account for the various temperatures that an aircraft will be expected to encounter.

In an alternative embodiment to the assembly method shown in FIG. 5, the IR window pane 210 could be set into the window frame 220. Next, both the window frame and the window pane are heated to a pre-assembly temperature which is at least an upper limit of the predetermined temperature range of interest (e.g., the highest possible temperature that the aircraft is expected to encounter). Adhesive 230 is applied at the area between the window pane 210 and the window frame 220 as shown in FIGS. 2 and 3 at the approximate temperature to which the assembly was heated; that is, an assembly temperature which exists prior to a substantial cooling of the window pane and the window frame. As referenced herein, a substantial cooling is defined as cooling to a temperature at or near the upper limit specified by the user, where, subsequent to assembly, stress to the frame and/or window during exposure to the predetermined temperature range of interest could cause damage to the frame and/or window pane. Accordingly, the adhesive is bonded and cured at or near the assembly temperature.

In exemplary embodiments, expansion or contraction of the window pane and/or window frame does not effect an ability to maintain electrical contact between the window pane 210 and the window frame 220.

Figure 6:
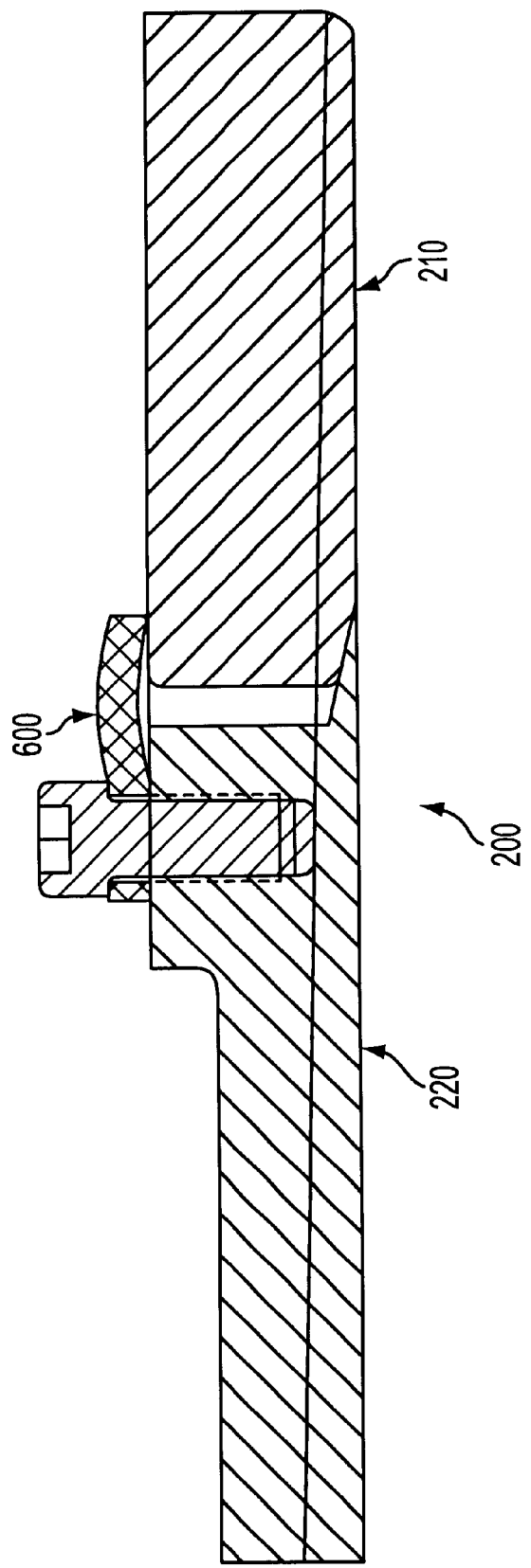
FIG. 6 illustrates a partial side view of a window in accordance with an exemplary embodiment of the present invention wherein the window pane is held in place by retainer clips.

FIG. 6, shows another exemplary embodiment of the present invention, wherein retaining clips have been used to secure the window pane in the frame. Due to the use of a retaining clip 600, adhesive is not needed to hold the window pane to the window frame, although both adhesive and retaining clips can be used, if desired. Additionally, or alternatively, spring clips can be used to push a window up into the window frame. The spring can supply force over the entire temperature range encountered by the aircraft.

It will be appreciated by those skilled in the art that the present invention can be embodied in other specific forms without departing from the spirit or embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. Method for forming a window frame assembly for use over a predetermined range of temperatures, comprising the steps of:
　establishing a receiving area on a window frame for an electrically conductive window pane;
　placing said electrically conductive window pane into the receiving area, such that a surface of the electrically conductive window pane electrically interfaces with a surface of the window frame;
　applying an adhesive to an area between the receiving area and the electrically conductive window pane;
　raising a temperature of said receiving area and said electrically conductive window pane to at least an upper limit of said predetermined range to thermally expand the electrically conductive window pane and the window frame and to maximize the area between the receiving area and the electrically conductive window pane;
　curing the adhesive at the raised temperature; and
　cooling the window frame assembly from the raised temperature to place a compressive force on the adhesive.

2. Method according to claim 1, wherein the surface of the electrically conductive window pane and a surface of the receiving area maintain constant contact over said predetermined range of temperatures.

3. Method according to claim 1, wherein said step of placing further comprises the step of:
　securing the electrically conductive window pane to the receiving area through the use of retaining clips.

4. Method according to claim 1, wherein the window frame assembly becomes stressed as the temperature of the window frame assembly decreases.

5. Method according to claim 1, wherein said electrically conductive window pane is placed in the receiving area so that it protrudes from an outer edge of said window frame.

6. Method according to claim 5, wherein the electrically conductive window pane protrudes from the outer edge of said window frame approximately 0.005 inch.

7. Method for forming a window frame assembly for use over a predetermined range of temperatures, comprising the steps of:
　establishing a receiving area on a window frame for an electrically conductive window pane;
　placing said electrically conductive window pane into the receiving area, such that a surface of the electrically conductive window pane interfaces with a surface of the window frame;
　raising a temperature of said receiving area and said electrically conductive window pane to at least an upper limit of said predetermined range; and
　applying an adhesive to an area between the receiving area and the electrically conductive window pane prior to substantial cooling of said receiving area and said electrically conductive window pane below said upper limit.

* * * * *

UNITED STATES PATENT AND TRADEMARK OFFICE
CERTIFICATE OF CORRECTION

PATENT NO. : 6,689,240 B2
DATED : February 10, 2004
INVENTOR(S) : David W. Jesse It is certified that error appears in the above-identified patent and that said Letters Patent is hereby corrected as shown below:

Column 6,
Lines 44-61, replace claim 7 with the following:

-- 7. Method for forming a window frame assembly for use over a predetermined range of temperatures, comprising the steps of:
    establishing a receiving area on a window frame for an electrically conductive window pane;
    placing said electrically conductive window pane into the receiving area, such that a surface of the electrically conductive window pane electrically interfaces with a surface of the window frame;
    raising a temperature of said receiving area and said electrically conductive window pane to at least an upper limit of said predetermined range; and
    applying an adhesive to an area between the receiving area and the electrically conductive window pane prior to substantial cooling of said receiving area and said electrically conductive window pane below said upper limit,
    wherein substantial cooling places a compressive stress on the adhesive. --

Signed and Sealed this

Twenty-seventh Day of July, 2004

JON W. DUDAS
*Acting Director of the United States Patent and Trademark Office*